(12) United States Patent
Sugiura

(10) Patent No.: US 8,935,968 B2
(45) Date of Patent: Jan. 20, 2015

(54) STEERING SYSTEM

(71) Applicant: JTEKT Corporation, Osaka-shi, Osaka (JP)

(72) Inventor: Tomonori Sugiura, Yamatokoriyama (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 14/079,172

(22) Filed: Nov. 13, 2013

(65) Prior Publication Data

US 2014/0137694 A1 May 22, 2014

(30) Foreign Application Priority Data

Nov. 21, 2012 (JP) .................................. 2012-255417

(51) Int. Cl.
*B62D 1/185* (2006.01)
*B62D 1/19* (2006.01)

(52) U.S. Cl.
CPC ................ *B62D 1/185* (2013.01); *B62D 1/192* (2013.01)
USPC ............................................................. 74/493

(58) Field of Classification Search
USPC ........... 74/492, 493; 280/775; 384/49, 50, 51; 464/167, 168, 183
See application file for complete search history.

(56) References Cited

U.S. PATENT DOCUMENTS

| | | | | |
|---|---|---|---|---|
| 3,538,785 A * | 11/1970 | Grancon | ......................... | 74/492 |
| 3,604,285 A * | 9/1971 | Olsson | ............................ | 74/492 |
| 3,815,438 A * | 6/1974 | Johnson | ........................... | 74/492 |
| 4,509,386 A * | 4/1985 | Kimberlin | ........................ | 74/492 |
| 4,664,534 A * | 5/1987 | Hanaway | ........................ | 384/49 |
| 5,722,300 A * | 3/1998 | Burkhard et al. | ................ | 74/493 |
| 5,797,696 A * | 8/1998 | Baynes et al. | ................ | 403/377 |
| 6,343,993 B1 * | 2/2002 | Duval et al. | ................... | 464/167 |
| 6,729,648 B2 * | 5/2004 | Ulintz | ........................... | 280/777 |
| 6,893,353 B2 * | 5/2005 | Dutkiewicz et al. | .......... | 464/167 |
| 7,717,794 B2 * | 5/2010 | Berger et al. | ................. | 464/167 |
| 7,798,525 B2 * | 9/2010 | Cymbal et al. | ................ | 280/777 |
| 2004/0245759 A1 | 12/2004 | Yamada et al. | | |
| 2006/0202463 A1* | 9/2006 | Schwarzbich et al. | ........ | 280/775 |
| 2009/0280914 A1* | 11/2009 | Kakutani et al. | .............. | 464/167 |

FOREIGN PATENT DOCUMENTS

| | | |
|---|---|---|
| JP | A-2006-151011 | 6/2006 |
| WO | WO 03/031250 A1 | 4/2003 |

\* cited by examiner

*Primary Examiner* — Paul N Dickson
*Assistant Examiner* — Robert A Coker
(74) *Attorney, Agent, or Firm* — Oliff PLC

(57) ABSTRACT

A steering system includes an outer tube at an upper side and an inner tube at a lower side that slide relative to each other in an axial direction when shock is absorbed. A first sliding resistance reducing element, which comes into contact with an inner periphery of the outer tube, and reduces sliding resistance between both the tubes, is retained in at least a circumferential lower region of an axial upper end portion of the inner tube. A second sliding resistance reducing element, which comes into contact with an outer periphery of the inner tube, and reduces the sliding resistance between both the tubes, is retained in at least a circumferential upper region of an axial lower end portion of the outer tube.

5 Claims, 12 Drawing Sheets

STEERING SYSTEM

INCORPORATION BY REFERENCE

The disclosure of Japanese Patent Application No. 2012-255417 filed on Nov. 21, 2012 including the specification, drawings and abstract, is incorporated herein by reference in its entirety.

BACKGROUND OF THE INVENTION

1. Field of the Invention

The present invention relates to a steering system.

2. Description of the Related Art

In a telescopic adjustment type steering system that adjusts the position of a steering wheel, which is a steering member, in an axial direction of a steering shaft, an inner shaft and an outer shaft that constitute the steering shaft are fitted to each other so as to be non-rotatable relative to each other and slidable relative to each other in the axial direction, and both the shafts are caused to slide relative to each other in the axial direction so as to perform telescopic adjustment. For example in Japanese Patent Application Publication No. 2006-151011 (JP 2006-151011 A), in a steering shaft, a rolling element is rollably retained by an annular bush inserted into an inner periphery of one end (open end) of an outer shaft, and the rolling element is pressed against an outer periphery of an inner shaft by the elastic force of the bush, in order to perform the telescopic adjustment smoothly.

Additionally, for example, in International Publication No. WO03/031250A1 in a steering shaft, a rolling element is interposed between an end portion of an inner shaft and an inner periphery of an outer shaft.

In the telescopic adjustment type steering system, a jacket, which supports the steering shaft so that the steering shaft is rotatable, is constituted by an outer tube and an inner tube that are fitted to each other so as to be slidable relative to each other in the axial direction. At the time of a secondary collision in which a driver collides with the steering wheel due to a collision (primary collision) of a vehicle, both the tubes slide relative to each other in the axial direction so as to absorb shock energy.

However, since the steering wheel tends to be pushed upward at the time of the secondary collision, a twist is apt to be caused between the outer tube and the inner tube. If the twist is caused, the sliding resistance between both the tubes may become large and both the tubes may not be able to smoothly slide relative to each other when shock is absorbed. In the case where the length of fit between both the tubes is set to be long in order to reduce the twist between both the tubes when shock is absorbed, it is difficult to reduce the size of the steering system in the axial direction while securing a required shock-absorbing stroke.

SUMMARY OF THE INVENTION

An object of the invention is to provide a small-sized steering system while securing a required shock-absorbing stroke.

A steering system according to an aspect of the invention includes an outer tube at an upper side and an inner tube at a lower side that support a steering shaft so that the steering shaft is rotatable, the outer tube and the inner tube sliding relative to each other in an axial direction when shock is absorbed, and the steering shaft having one end to which a steering member is coupled; a first sliding resistance reducing element that is retained in at least a circumferential lower region of an axial upper end portion of the inner tube, comes into contact with an inner periphery of the outer tube, and reduces sliding resistance between the outer tube and the inner tube; and a second sliding resistance reducing element that is retained in at least a circumferential upper region of an axial lower end portion of the outer tube, comes into contact with an outer periphery of the inner tube, and reduces the sliding resistance between the outer tube and the inner tube.

In the steering system according to the above-described aspect, the first sliding resistance reducing element, which comes into contact with the inner periphery of the outer tube at the upper side, is retained in at least the circumferential lower region of the axial upper end portion of the inner tube at the lower side, and the second sliding resistance reducing element, which comes into contact with the outer periphery of the inner tube, is retained in at least the circumferential upper region of the axial lower end portion of the outer tube. Accordingly, even when a moment that tilts the outer tube with respect to the inner tube is generated so as to push up the axial upper end portion of the outer tube at the upper side at the time of a secondary collision of a vehicle, the outer tube and the inner tube can be caused to slide relative to each other smoothly due to the function of the first sliding resistance reducing element and the function of the second sliding resistance reducing element. Since the length of fit between the outer tube and the inner tube can be made as short as possible, size reduction can be achieved while securing a predetermined shock-absorbing stroke.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
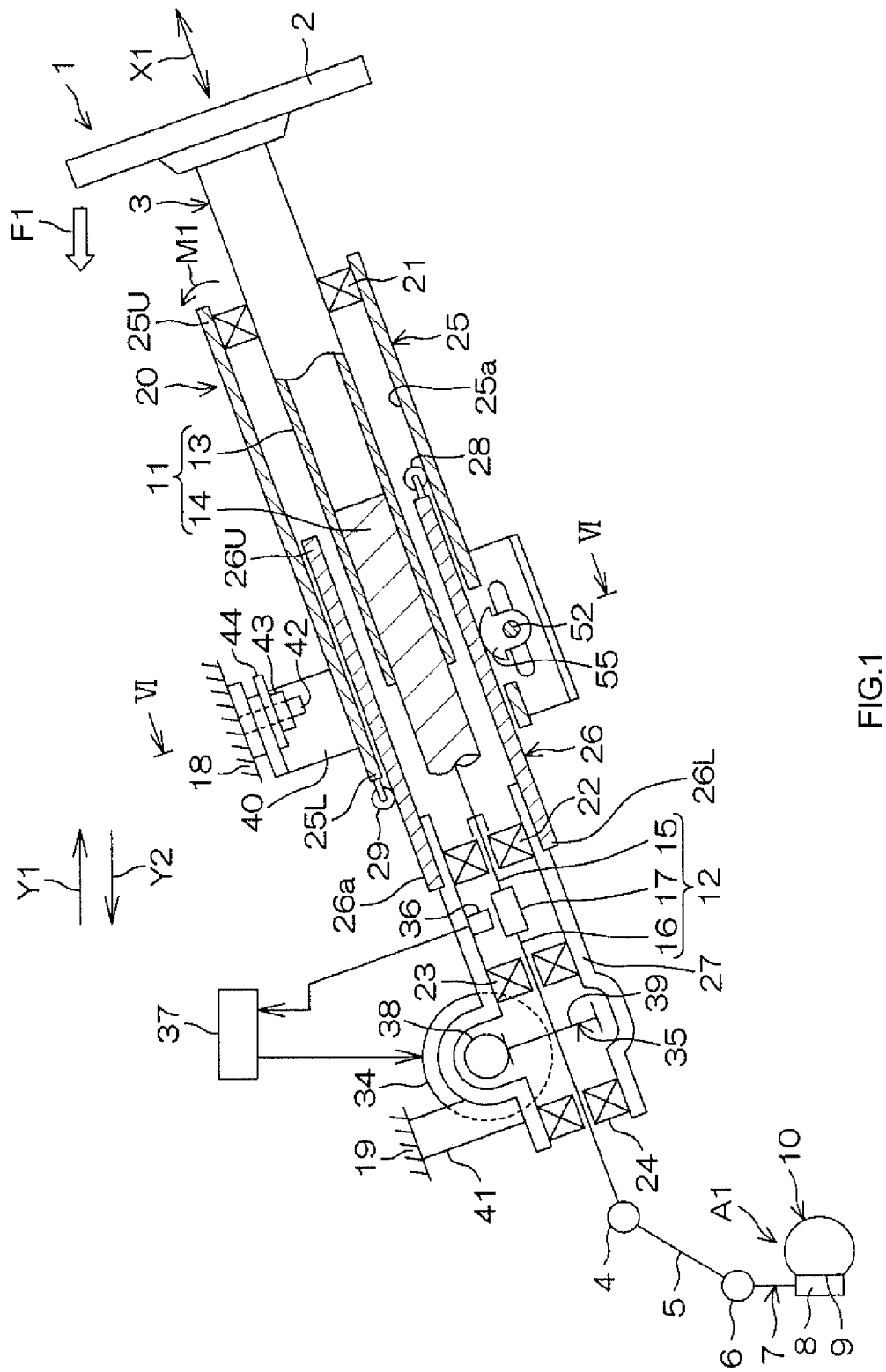
FIG. 1 is a schematic sectional view showing a steering system according to an embodiment of the invention.

Hereinafter, embodiments of the invention will be described with reference to the accompanying drawings. FIG. 1 is a schematic view of the schematic configuration of a steering system of an embodiment of the invention. Although the present embodiment will be described according to a case where the steering system is an electric power steering system, the invention may be applied to a manual steering system. Referring to FIG. 1, a steering system 1 includes a steering shaft 3 that is coupled to a steering member 2, such as a steering wheel, an intermediate shaft 5 that is coupled to the steering shaft 3 via a universal joint 4, a pinion shaft 7 that is coupled to the intermediate shaft 5 via a universal joint 6, and a rack shaft 8 as a steered shaft, which has a rack 8a that meshes with a pinion 7a provided in the vicinity of an end portion of the pinion shaft 7.

A steered mechanism A1 is constituted by a rack-and-pinion mechanism including the pinion shaft 7 and the rack shaft 8. The rack shaft 8 is supported by a housing (not shown) so as to be movable in an axial direction (direction perpendicular to the plane of paper) along a right-and-left direction of a vehicle. Although respective end portions of the rack shaft 8 are not shown, the end portions are coupled to corresponding steered wheels via corresponding tie rods and corresponding knuckle arms.

The steering shaft 3 includes a first steering shaft 11 and a second steering shaft 12 that are coaxially coupled to each other. The first steering shaft 11 includes an upper shaft 13 and a lower shaft 14 that are fitted to each other, for example using spline coupling, so as to be rotatable together and slidable relative to each other in the axial direction. Either the upper shaft 13 or the lower shaft 14 constitutes an inner shaft, and the other constitutes a tubular outer shaft.

The second steering shaft 12 includes an input shaft 15 that is coupled to the lower shaft 14 so as to be rotatable together with the lower shaft 14, an output shaft 16 that is coupled to the intermediate shaft 5 via the universal joint 4 so as to be rotatable together with the intermediate shaft 5, and a torsion bar 17 that couples the input shaft 15 and the output shaft 16 so that the input shaft 15 and the output shaft 16 are rotatable relative to each other. The steering shaft 3 is rotatably supported by a steering column 20 via a first bearing 21, a second bearing 22, a third bearing 23, and a fourth bearing 24. The steering column 20 is fixed to vehicle-body-side members 18 and 19.

Figure 2:
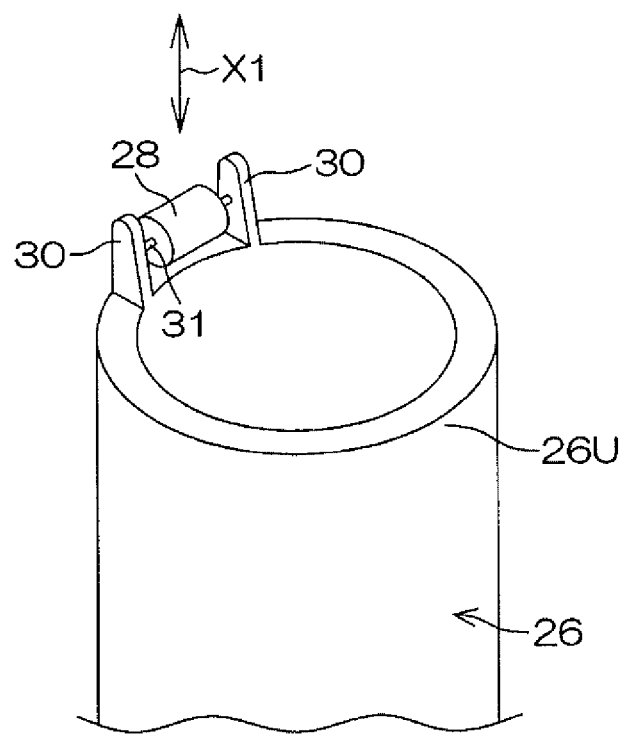
FIG. 2 is a schematic perspective view showing an axial upper end portion of an inner tube of a steering column of the steering system in FIG. 1, and portions around the axial upper end portion of the inner tube.
Figure 3:
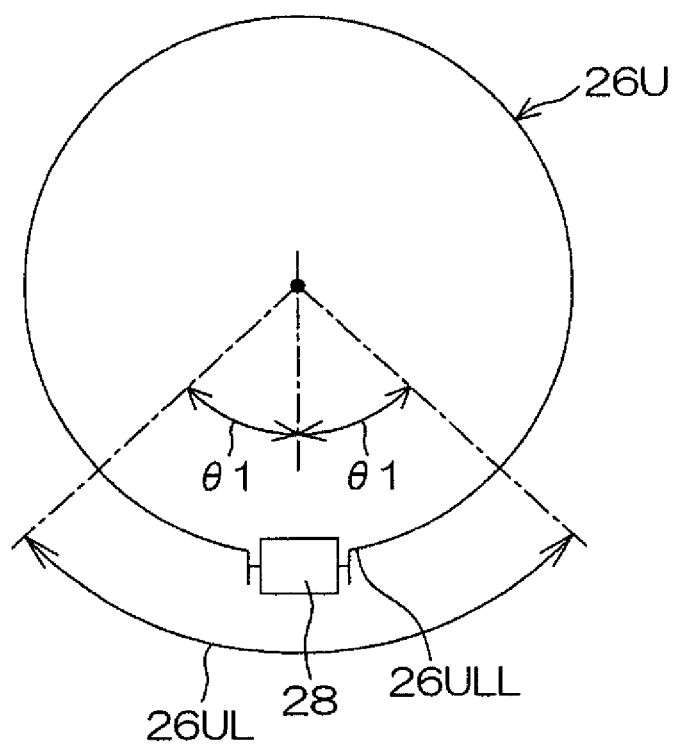
FIG. 3 is a schematic view showing a section of the axial upper end portion of the inner tube in FIG. 2.

The steering column 20 includes an outer tube 25 at an upper side and an inner tube 26 at a lower side that are fitted to each other so as to be slidable relative to each other in an axial direction X1, and a housing 27 that is coupled to an axial lower end portion 26L of the inner tube 26. Referring to FIGS. 1, 2, and 3, a cylindrical roller 28, which constitutes a rolling element as a first sliding resistance reducing element that comes into contact with an inner periphery 25a of the outer tube 25 and reduces the sliding resistance between both the tubes 25 and 26, is retained in at least a circumferential lower region 26UL (in the present embodiment, a circumferential lower end portion 26ULL within the circumferential lower region 26UL as shown in FIG. 3) of an axial upper end portion 26U of the inner tube 26.

As shown in FIG. 3, in the axial upper end portion 26U of the inner tube 26, the circumferential lower region 26UL is a region within a range composed of right and left ranges located on right and left sides of a line extending downward from a center, each of the right and left ranges corresponding to a central angle θ1 (θ1=45 degrees). In the present embodiment, the cylindrical roller 28 that is the first sliding resistance reducing element is arranged at the circumferential lower end portion 26ULL in the circumferential lower region 26UL. Instead of this configuration, however, a pair of cylindrical rollers may be arranged at bilaterally symmetrical positions so that the points of contact with the inner periphery 25a of the outer tube 25 are arranged within the circumferential lower region 26UL.

Figure 4:
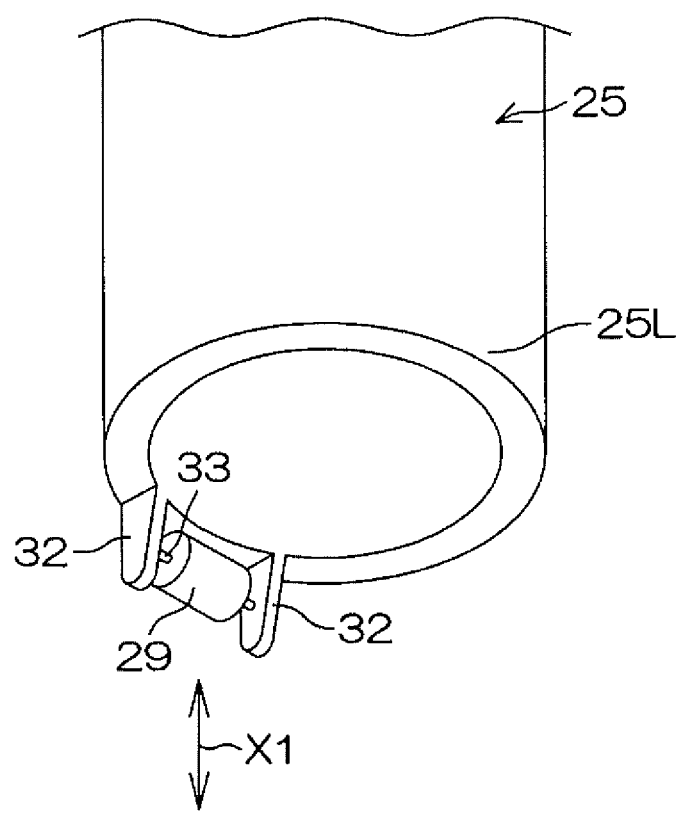
FIG. 4 is a schematic perspective view showing an axial lower end portion of an outer tube of the steering column of the steering system in FIG. 1, and portions around the axial lower end portion of the outer tube.
Figure 5:
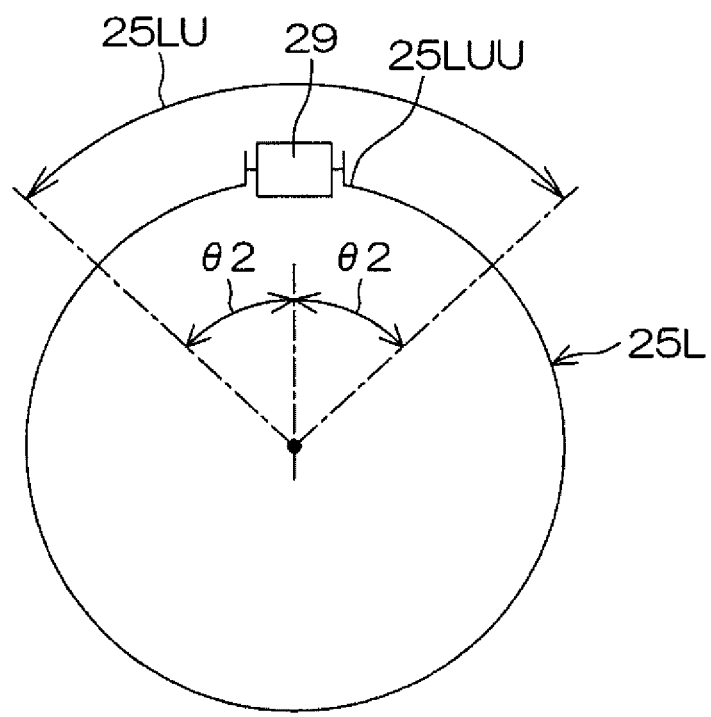
FIG. 5 is a schematic view showing a section of the axial lower end portion of the outer tube in FIG. 4.

As shown in FIG. 2, the axial upper end portion 26U of the inner tube 26 is provided with a pair of stays 30 extending upward in the axial direction X1. The cylindrical roller 28 is rotatably supported by a support shaft 31 whose two ends are supported by the pair of stays 30. The support shaft 31 is arranged along a direction parallel to a line tangent to the inner tube 26. Referring to FIGS. 1, 4, and 5, a cylindrical roller 29, which constitutes a rolling element as a second sliding resistance reducing element that comes into contact with an outer periphery 26a of the inner tube 26 and reduces the sliding resistance between both the tubes 25 and 26, is retained in at least a circumferential upper region 25LU (in the present embodiment, a circumferential upper end portion 25LUU within the circumferential upper region 25LU as shown in FIG. 5) of an axial lower end portion 25L of the outer tube 25.

As shown in FIG. 5, in the axial lower end portion 25L of the outer tube 25, the circumferential upper region 25LU is a region within a range composed of right and left ranges located on right and left sides of a line extending upward from a center, each of the right and left ranges corresponding to a central angle θ2 (θ2=45 degrees). In the present embodiment, the cylindrical roller 29 that is the second sliding resistance reducing element is arranged at the circumferential upper end portion 25LUU in the circumferential upper region 25LU. Instead of this configuration, however, a pair of cylindrical rollers may be arranged at bilaterally symmetrical positions so that the points of contact with the outer periphery 26a of the inner tube 26 are arranged within the circumferential upper region 25LU.

As shown in FIG. 4, the axial lower end portion 25L of the outer tube 25 is provided with a pair of stays 32 extending downward in the axial direction X1. The cylindrical roller 29 is rotatably supported by a support shaft 33 whose both ends are supported by the pair of stays 32. The support shaft 33 is arranged along a direction parallel to a line tangential to the outer tube 25.

Referring back to FIG. 1, a speed-reducing mechanism 35 is housed within a housing 27. The speed-reducing mechanism 35 reduces the speed of the rotation from a steering assisting electric motor 34 to transmit the rotation, whose speed has been reduced, to an output shaft 16. A torque sensor 36, which detects a steering torque on the basis of the relative rotation between the input shaft 15 and the output shaft 16, is housed within the housing 27. A torque detection result obtained by the torque sensor and a vehicle speed detection result obtained by a vehicle speed sensor (not shown) are input to an electronic control unit (ECU) 37. The ECU 37 controls the driving of the electric motor 34 (i.e., performs steering assisting control) so that the electric motor 34 generates a steering assisting force, on the basis of both of the detection results.

The speed-reducing mechanism 35 includes a driving gear 38 that is coupled to a rotary shaft (not shown) of the electric motor 34 so as to be rotatable together with the rotary shaft, and a driven gear 39 that meshes with the driving gear 38 and rotates together with the output shaft 16. The driving gear 38 is constituted by, for example, a worm shaft, and the driven gear 39 is constituted by, for example, a worm wheel. The speed-reducing mechanism 35 transmits a steering assisting force generated by the electric motor 34 to the output shaft 16.

The first bearing 21 is retained by an inner periphery of the axial upper end portion 25U of the upper tube 25, and supports the upper shaft 13 so that the upper shaft 13 is rotatable. The second bearing 22 is retained by the housing 27, and supports the input shaft 15 so that the input shaft 15 is rotatable. The third bearing 23 and the fourth bearing 24 are retained by the housing 7, and are located on respective sides of the driven gear 39 to support the output shaft 16 so that the output shaft 16 is rotatable. The steering column 20 is fixed to the vehicle-body-side members 18 and 19 via an upper bracket 40 at a vehicle rear Y1-side and a lower bracket 41 at a vehicle front Y2-side. The upper bracket 40 can be fixed to the outer tube 25 at the upper side of the steering column 20 via a column bracket to be described below. The upper bracket 40 is fixed to the vehicle-body-side member 18, using fixing bolts (stud bolts) 42 that protrude downward from the vehicle-body-side member 18, nuts 43 that are screwed to the fixing bolts 42, and capsules 44 that are detachably retained by the upper bracket 40.

Figure 6:
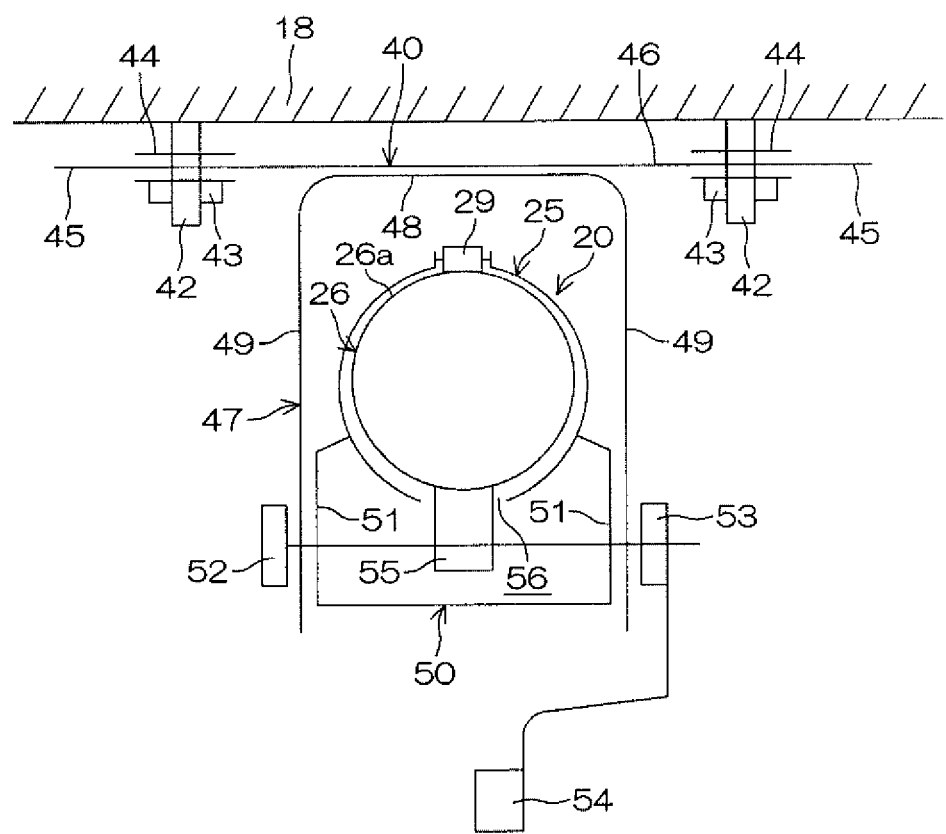
FIG. 6 is a schematic sectional view of main portions of the steering system in FIG. 1, FIG. 6 showing a section taken along a line VI-VI in FIG. 1.

The lower bracket 41 is fixed to the inner tube 26 at the lower side of the steering column 20. The lower bracket 41 is fixed to the vehicle-body-side member 19, using a fixing bolt (not shown). With reference to FIG. 6 that is a sectional view taken along line VI-VI in FIG. 1, the pair of right and left fixing bolts 42 is provided, and the fixing bolts 42 are inserted through the upper bracket 40 and the respective capsules 44. By fastening the nuts 43 to the respective fixing bolts 42, the upper bracket 40 and the capsules 44 are held between the vehicle-body-side member 18 and the nuts 43, and thus, the upper bracket 40 is fixed to the vehicle-body-side member 18. At the time of a secondary collision, the upper bracket 40 is separated from the vehicle-body-side member 18 as a resin pin (not shown) provided in each capsule 44 breaks.

The upper bracket 40 is formed of, for example, sheet metal. The upper bracket 40 includes an upper plate 46 having a pair of right and left attachment seats 45, and a main body portion 47 that is fixed to the upper plate 46 and has a groove shape that opens downward. The main body portion 47 includes a web 48 as an upper plate that is fixed to a lower surface of the upper plate 46, and a pair of side plates 49 extending from respective ends of the web 48. On the other hand, a column bracket 50 with a groove shape that opens upward is fixed to the outer tube 25 at the upper side of the steering column 20. The column bracket 50 includes a pair of side plates 51 facing the pair of side plates 49 of the upper bracket 40, respectively.

A fastening shaft 52 constituted by a bolt extending through the side plates 49 and 51 of the upper bracket 40 and the column bracket 50 is provided. By rotating a nut 53 screwed to the fastening shaft 52 by the rotational operation of an operating lever 54, both of the side plates 49 and 51 are fastened between the head of the bolt as the fastening shaft 52, and the nut 53 to lock both of the side plates 49 and 51. Accordingly, the position of the steering member 2 after telescopic adjustment is locked, and telescopic locking is achieved.

On the other hand, an eccentric cam 55 that rotates together with the fastening shaft 52 is provided at an intermediate portion of the fastening shaft 52 in the axial direction. As the eccentric cam 55, which is rotated together with the fastening shaft 52 by the rotational operation of the operating lever 54, pushes up the outer periphery 26a of the inner tube 26 through an opening 56 formed in the outer tube 25, the backlash between both the tubes 25 and 26 is removed at the time of the telescopic locking.

According to the present embodiment, the cylindrical roller 28, which is the first sliding resistance reducing element coming into contact with the inner periphery 25a of the outer tube 25, is retained in at least the circumferential lower region 26UL of the axial upper end portion 26U of the inner tube 26, and the cylindrical roller 29, which is the second sliding resistance reducing element coming into contact with the outer periphery 26a of the inner tube 26, is retained in at least the circumferential upper region 25LU of the axial lower end portion 25L of the outer tube 25.

Even when the steering member 2 receives a force F1 (refer to FIG. 1) toward the vehicle front Y2 at the secondary collision of the vehicle, and thus, a moment M1 (refer to FIG. 1) that tilts the outer tube 25 with respect to the inner tube 26 is generated so as to push up the axial upper end portion 25U of the outer tube 25 at the upper side, both the tubes 25 and 26 can be caused to slide smoothly due to the function of the cylindrical roller 28 that is the first sliding resistance reducing element and the function of the cylindrical roller 29 that is the second sliding resistance reducing element. Since the length of fit between both the tubes 25 and 26 can be made as short as possible, size reduction can be achieved while securing a predetermined shock-absorbing stroke.

In addition, in the case where at least one of the first sliding resistance reducing element and the second sliding resistance reducing element is a rolling element (in the present embodiment, both of the first sliding resistance reducing element and the second sliding resistance reducing element are rolling elements, i.e., the cylindrical rollers 28 and 29, respectively), both the tubes 25 and 26 can be caused to slide more smoothly at the time of shock absorption. Particularly, the cylindrical roller 28 that is the first sliding resistance reducing element and the cylindrical roller 29 that is the second sliding resistance reducing element are respectively arranged at the circumferential lower end portion 26ULL of the axial upper end portion 26U of the inner tube 26 and the circumferential upper end portion 25LUU of the axial lower end portion 25L of the outer tube 25, the circumferential lower end portion 26ULL and the circumferential upper end portion 25LUU being most strongly pressed against the tubes 25 and 26, respectively when the moment M1 that tilts the outer tube 25 at the upper side with respect to the inner tube 26 at the lower side is generated at the time of the secondary collision of the vehicle. Therefore, both the tubes 25 and 26 can be reliably caused to slide smoothly at the time of the shock absorption.

Figure 7:
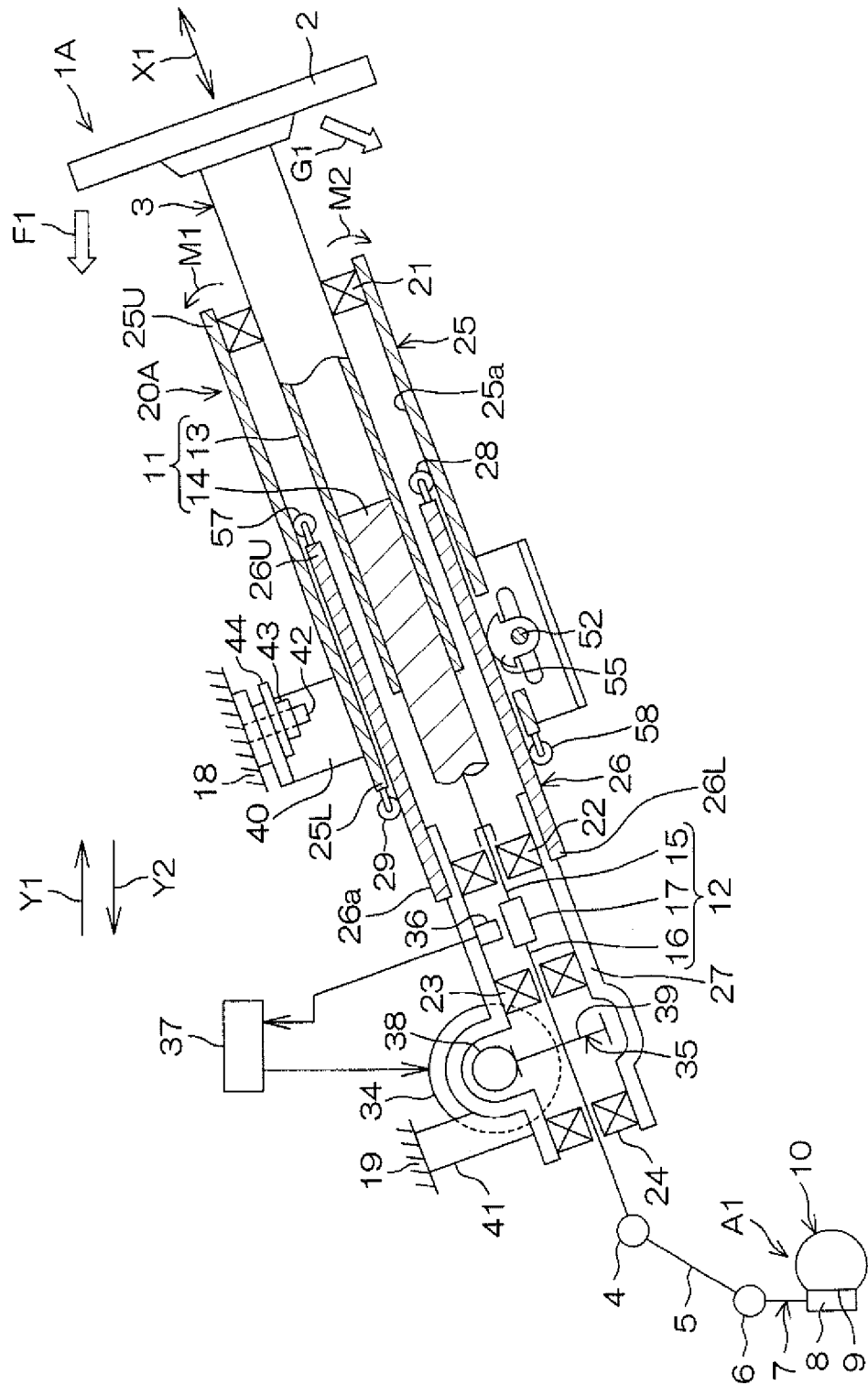
FIG. 7 is a schematic sectional view showing a steering system according to another embodiment of the invention.
Figure 8:
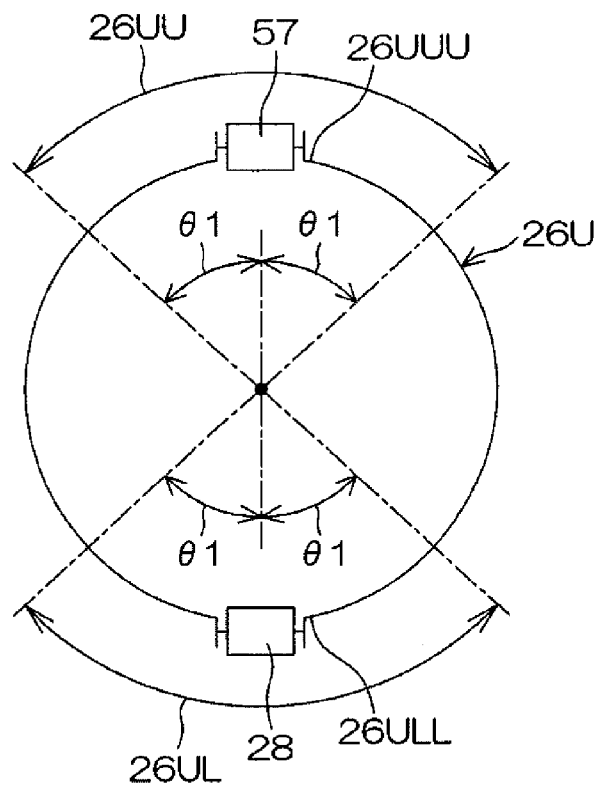
FIG. 8 is a schematic view showing a section of an axial upper end portion of an inner tube of the steering system in FIG. 7.
Figure 9:
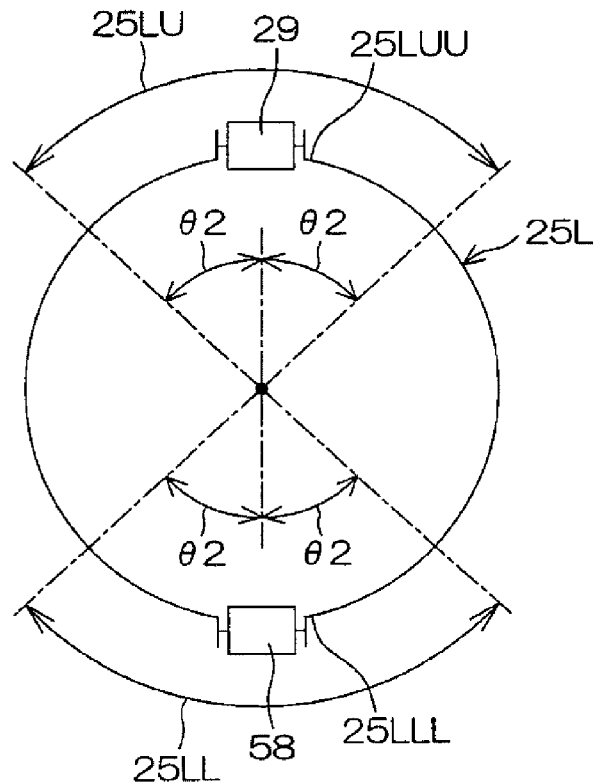
FIG. 9 is a schematic view showing a section of an axial lower end portion of an outer tube of the steering system in FIG. 7.

FIG. 7 shows a steering system 1A of another embodiment of the invention. FIG. 8 is a schematic view showing a section of the axial upper end portion 26U of the inner tube 26 of a steering column 20A of the steering system 1A. FIG. 9 is a schematic view showing a section of the axial lower end portion of the outer tube of the steering system in FIG. 7. The steering system 1A of the present embodiment is different from the steering system 1 in FIG. 1 in that a cylindrical roller 57 and a cylindrical roller 58 are added. Referring to FIGS. 7 and 8, the cylindrical roller 57, which constitutes a rolling element as a third sliding resistance reducing element that comes into contact with the inner periphery 25a of the outer tube 25 and reduces the sliding resistance between both the tubes 25 and 26, is retained in at least a circumferential upper region 26UU (in the present embodiment, a circumferential upper end portion 26UUU within the circumferential upper region 26UU as shown in FIG. 8) of the axial upper end portion 26U of the inner tube 26.

Referring to FIGS. 7 and 9, the cylindrical roller 58, which constitutes a rolling element as a fourth sliding resistance reducing element that comes into contact with the outer periphery 26a of the inner tube 26 and reduces the sliding resistance between both the tubes 25 and 26, is retained in at least a circumferential lower region 25LL (in the present embodiment, a circumferential lower end portion 25LLL within the circumferential lower region 25LL as shown in FIG. 9) of the axial lower end portion 25L of the outer tube 25.

With regard to the constituent elements of the present embodiment, the same constituent elements as those of the embodiment in FIGS. 1 to 6 are designated by the same reference numerals as the reference numerals of the constituent elements of the embodiment in FIGS. 1 to 6. In addition, the cylindrical rollers 57 and 58 are rotatably supported using stays and supporting shafts, as in the case of the cylindrical rollers 28 and 29. According to the present embodiment, the following effects are achieved in addition to achieving the same effects as those of the embodiment in FIG. 1. That is, the cylindrical roller 57, which is the third sliding resistance reducing element coming into contact with the inner periphery 25a of the outer tube 25, is retained in at least the circumferential upper region 26UU of the axial upper end portion 26U of the inner tube 26, and the cylindrical roller 58, which is the fourth sliding resistance reducing element coming into contact with the outer periphery 26a of the inner tube 26, is retained in at least the circumferential lower region 25LL of the axial lower end portion 25L of the outer tube 25. Accordingly, even when a moment M2 that tilts the outer tube 25 with respect to the inner tube 26 is generated so that the axial upper end portion 25U of the outer tube 25 at the upper side is pushed downward by the weight G1 of the steering member 2, or the like at the time of telescopic adjustment, both the tubes 25 and 26 can be caused to slide smoothly due to the function of the cylindrical roller 57 that is the third sliding resistance reducing element and the function of the cylindrical roller 58 that is the fourth sliding resistance reducing element.

In addition, both the tubes 25 and 26 can be caused to slide more smoothly at the time of telescopic adjustment in the case where at least one of the third sliding resistance reducing element and the fourth sliding resistance reducing element is a rolling element (in the present embodiment, both of the third sliding resistance reducing element and the fourth sliding resistance reducing element are rolling elements, i.e., the cylindrical rollers 57 and 58, respectively). Particularly, the cylindrical roller 57 that is the third sliding resistance reducing element and the cylindrical roller 58 that is the fourth sliding resistance reducing element are respectively arranged at the circumferential upper end portion 26UUU of the axial upper end portion 26U of the inner tube 26 and the circumferential lower end portion 25LLL of the axial lower end portion 25L of the outer tube 25, the circumferential upper end portion 26UUU and the circumferential lower end portion 25LLL being most strongly pressed against the tubes 25 and 26, respectively when the moment M2 that tilts the outer tube 25 at the upper side with respect to the inner tube 26 at the lower side is generated at the time of telescopic adjustment. Therefore, both the tubes 25 and 26 can be reliably caused to slide smoothly at the time of the telescopic adjustment.

Figure 10:
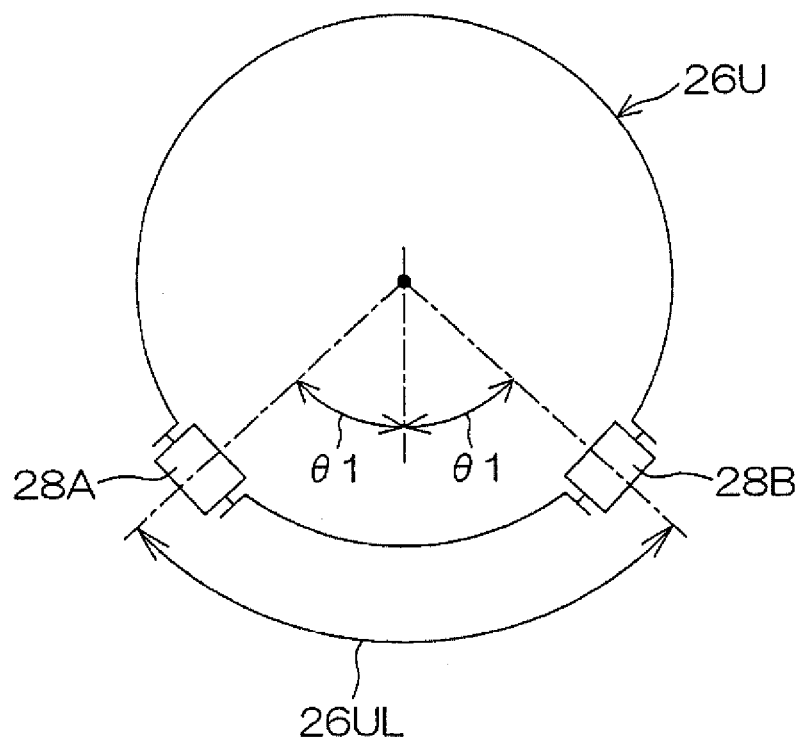
FIG. 10 is a schematic view showing a section of an axial upper end portion of an inner tube in yet another embodiment of the invention, FIG. 10 showing a modification of the embodiment in FIG. 3.

The invention is not limited to the above-described embodiments. For example, instead of the single cylindrical roller 28 that is the first sliding resistance reducing element arranged at the circumferential lower end portion 26ULL of the axial upper end portion 26U of the inner tube 26 in FIG. 3, a pair of cylindrical rollers 28A and 28B may be provided at bilaterally symmetrical positions within the circumferential lower region 26UL of the axial upper end portion 26U, as shown in FIG. 10.

Figure 11:
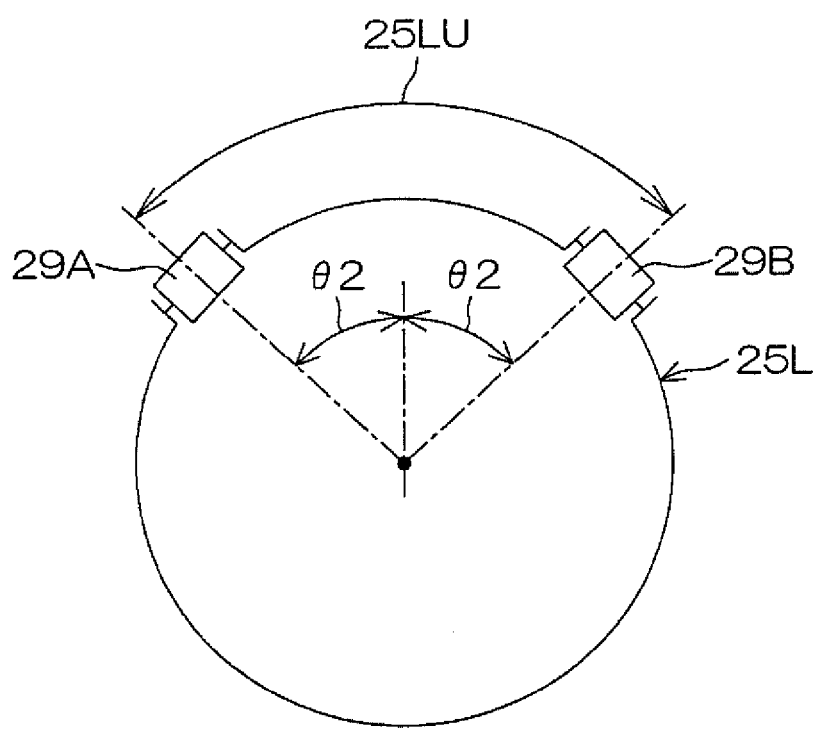
FIG. 11 is a schematic view showing a section of an axial lower end portion of an outer tube in yet another embodiment of the invention, FIG. 11 showing a modification of the embodiment in FIG. 5.
Figure 12:
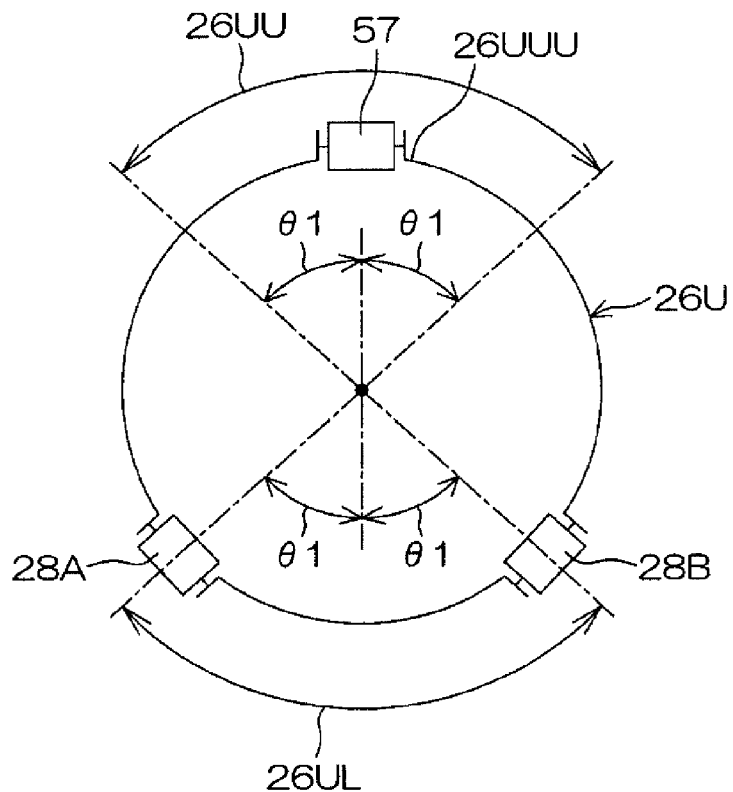
FIG. 12 is a schematic view showing a section of an axial upper end portion of an inner tube in yet another embodiment of the invention, FIG. 12 showing a modification of the embodiment in FIG. 8.

Instead of the single cylindrical roller 29 that is the second sliding resistance reducing element arranged at the circumferential upper end portion 25LUU of the axial lower end portion 25L of the outer tube 25 in FIG. 5, a pair of cylindrical rollers 29A and 29B may be provided at bilaterally symmetrical positions within the circumferential upper region 25LU of the axial lower end portion 25L, as shown in FIG. 11. Instead of the single cylindrical roller 28 that is the first sliding resistance reducing element arranged at the circumferential lower end portion 26ULL of the axial upper end portion 26U of the inner tube 26 in FIG. 8, a pair of cylindrical rollers 28A and 28B may be provided at bilaterally symmetrical positions within the circumferential lower region 26UL of the axial upper end portion 26U, as shown in FIG. 12.

Figure 13:
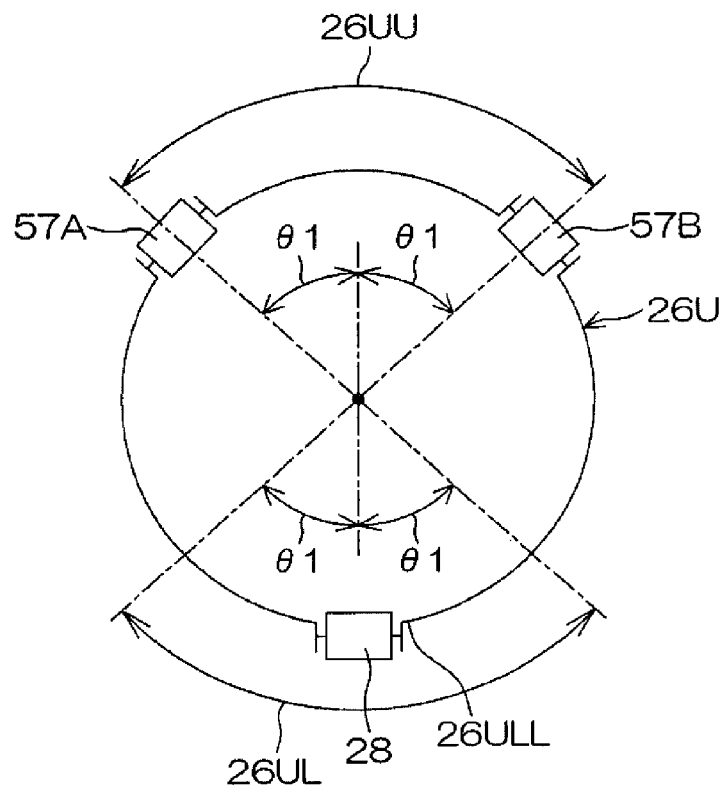
FIG. 13 is a schematic view showing a section of an axial upper end portion of an inner tube in yet another embodiment of the invention, FIG. 13 showing a modification of the embodiment in FIG. 8.
Figure 14:
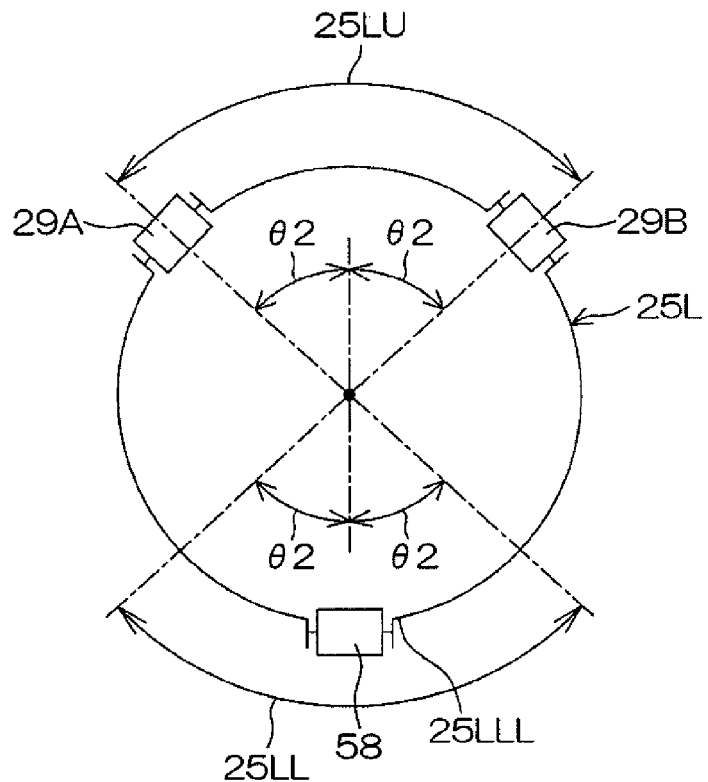
FIG. 14 is a schematic view showing a section of an axial lower end portion of an outer tube in yet another embodiment of the invention, FIG. 14 showing a modification of the embodiment in FIG. 9.

Instead of the single cylindrical roller 57 that is the third sliding resistance reducing element arranged at the circumferential upper end portion 26UUU of the axial upper end portion 26U of the inner tube 26 in FIG. 8, a pair of cylindrical rollers 57A and 57B may be provided at bilaterally symmetrical positions within the circumferential upper region 26UU of the axial upper end portion 26U, as shown in FIG. 13. Instead of the single cylindrical roller 29 that is the second sliding resistance reducing element arranged at the circumferential upper end portion 25LUU of the axial lower end portion 25L of the outer tube 25 in FIG. 9, a pair of cylindrical rollers 29A and 29B may be provided at bilaterally symmetrical positions within the circumferential upper region 25LU of the axial lower end portion 25L, as shown in FIG. 14.

Figure 15:
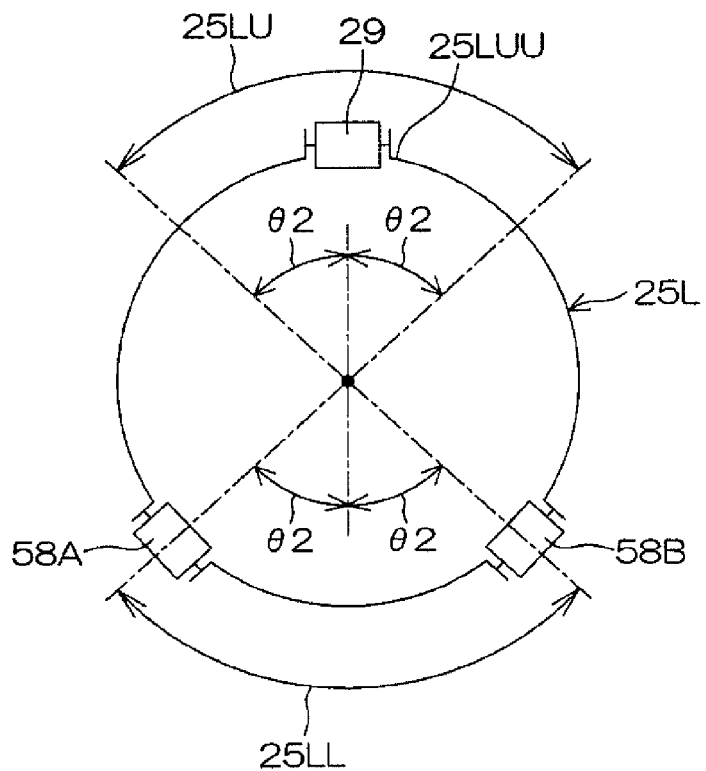
FIG. 15 is a schematic view showing a section of an axial lower end portion of an outer tube in yet another embodiment of the invention, FIG. 15 showing a modification of the embodiment in FIG. 9.
Figure 16:
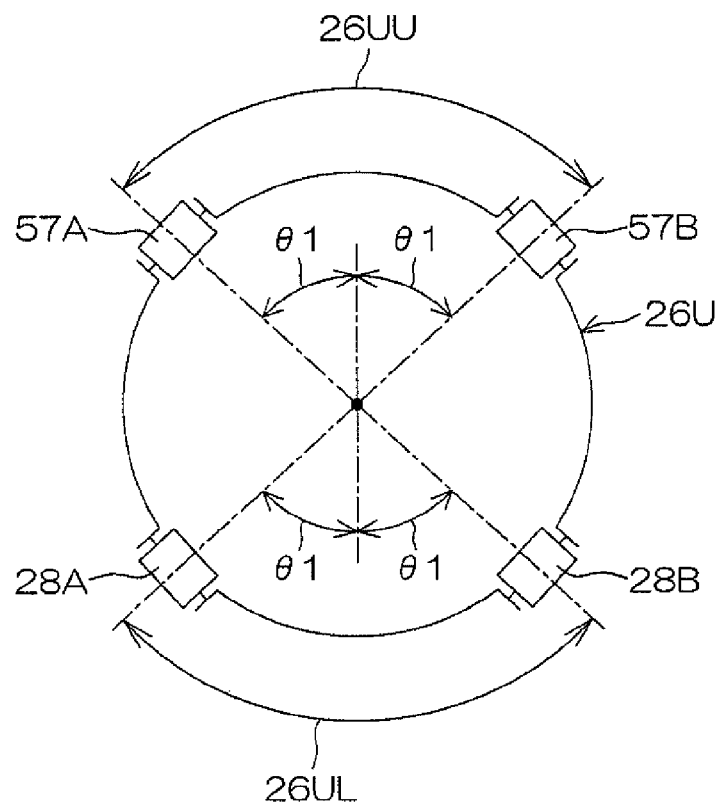
FIG. 16 is a schematic view showing a section of an axial upper end portion of an inner tube in yet another embodiment of the invention, FIG. 16 showing a modification of the embodiment in FIG. 8.

Instead of the single cylindrical roller 58 that is the fourth sliding resistance reducing element arranged at the circumferential lower end portion 25LLL of the axial lower end portion 25L of the outer tube 25 in FIG. 9, a pair of cylindrical rollers 58A and 58B may be provided at bilaterally symmetrical positions within the circumferential lower region 25LL of the axial lower end portion 25L, as shown in FIG. 15. In each of the modified embodiments in FIGS. 12 to 15, three cylindrical rollers (rolling elements; sliding resistance reducing elements) are arranged in the circumferential direction. On the other hand, it is also conceivable to use four cylindrical rollers (rolling elements; sliding resistance reducing elements) arranged in the circumferential direction. For example, as shown in FIG. 16 showing a modification of the embodiment in FIG. 8, the cylindrical rollers 28A and 28B as two first sliding resistance reducing elements and the cylindrical rollers 57A and 57B as two third sliding resistance reducing elements may be provided at the axial upper end portion 26U of the inner tube 26.

Figure 17:
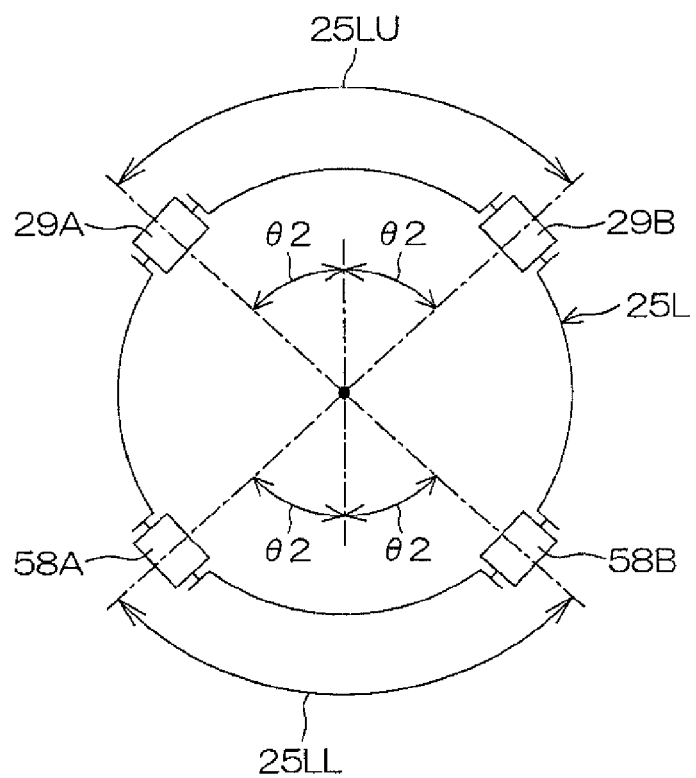
FIG. 17 is a schematic view showing a section of an axial lower end portion of an outer tube in yet another embodiment of the invention, FIG. 17 showing a modification of the embodiment in FIG. 9.

As shown in FIG. 17 showing a modification of the embodiment in FIG. 9, the cylindrical rollers 29A and 29B as two second sliding resistance reducing elements and the cylindrical rollers 58A and 58B as two fourth sliding resistance reducing elements may be provided at the axial lower end portion 25L of the outer tube 25. In each of the above-described embodiments, the cylindrical roller is used as the rolling element that constitutes each sliding resistance reducing element. However, a barrel-shaped roller may be used instead of the cylindrical roller that comes into rolling contact with the inner periphery 25a of the outer tube 25, or a drum-shaped roller may be used instead of the cylindrical roller that comes into rolling contact with the outer periphery 26a of the inner tube 26.

Figure 18:
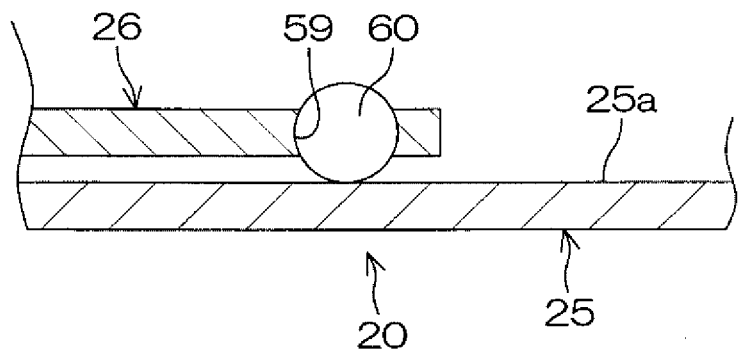
FIG. 18 is a schematic sectional view showing a steering column in yet another embodiment of the invention, FIG. 18 showing an example in which a ball is used as a rolling element that comes rolling contact with an outer tube.
Figure 19:
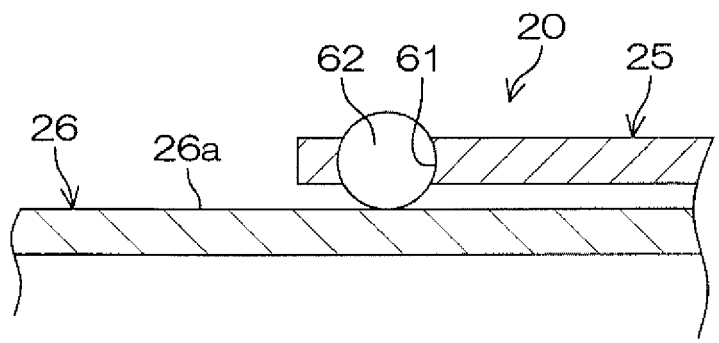
FIG. 19 is a schematic sectional view showing a steering column in yet another embodiment of the invention, FIG. 19 showing an example in which a ball is used as a rolling element that comes rolling contact with an inner tube.

In each of the above-described embodiments, as the rolling element that constitutes each sliding resistance reducing element, a ball may be used instead of the roller. For example, as shown in FIG. 18, a ball 60, which is retained by a retaining hole 59 formed in the inner tube 26 and comes into rolling contact with the inner periphery 25a of the outer tube 25, may be used as the first sliding resistance reducing element or the third sliding resistance reducing element. As shown in FIG. 19, a ball 62, which is retained by a retaining hole 61 formed in the outer tube 25 and comes into rolling contact with the outer periphery 26a of the inner tube 26, may be used as the second sliding resistance reducing element or the fourth sliding resistance reducing element.

As the sliding resistance reducing element, a plain bearing may be configured using a low-friction coating applied to the corresponding tube 25 or 26, instead of using the rolling element. As a low-friction material that constitutes the low-friction coating, for example, fluororesin may be used. In the embodiments in FIGS. 1 to 19, a portion of the steering column 20 is constituted by the outer tube 25 at the upper side and the inner tube 26 at the lower side. Instead of this configuration, however, a portion of a steering column 120 or 120A may be constituted by an outer tube 125 at a lower side and an inner tube 126 at an upper side as in a steering system 100 of an embodiment in FIG. 20 or a steering system 100A of an embodiment in FIG. 21. With regard to the constituent elements of the embodiments in FIGS. 20 and 21, the same constituent elements as the constituent elements of the embodiments in FIGS. 1 to 19 are designated by the same reference numerals as the reference numerals of the constituent elements of the embodiments in FIGS. 1 to 19.

Figure 20:
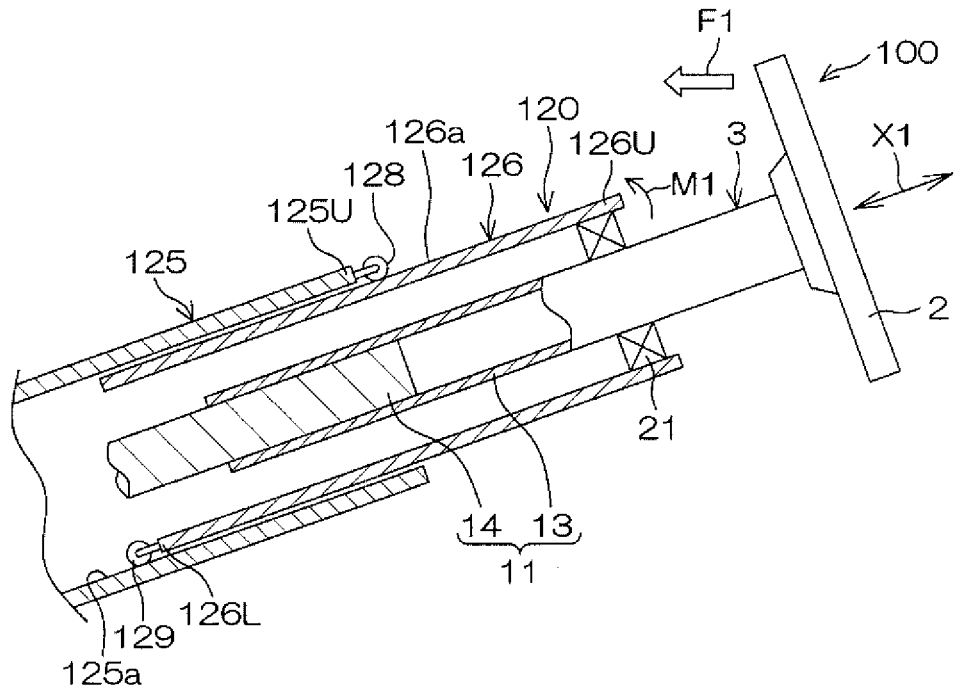
FIG. 20 is a schematic sectional view of main portions of a steering system in yet another embodiment of the invention.

In the steering system 100 of the embodiment in FIG. 20, a first sliding resistance reducing element that comes into contact with an outer periphery 126a of the inner tube 126 and reduces the sliding resistance between both the tubes 125 and 126, for example, a cylindrical roller 128 as a rolling element is retained in at least a circumferential upper region of an axial upper end portion 125U of the outer tube 125 at the lower side of the steering column 120. In addition, a second sliding resistance reducing element that comes into contact with an inner periphery 125a of the outer tube 125 and reduces the sliding resistance between both the tubes 125 and 126, for example, a cylindrical roller 129 as a rolling element is retained in at least a circumferential lower region of an axial lower end portion 126L of the inner tube 126.

According to the embodiment in FIG. 20, even when a moment M1 that tilts the inner tube 126 with respect to the outer tube 125 is generated so as to push up the axial upper end portion 126U of the inner tube 126 at the upper side at the time of the secondary collision of the vehicle, both the tubes 125 and 126 can be caused to slide smoothly due to the function of the first sliding resistance reducing element, for example, the cylindrical roller 128, and the function of the second sliding resistance reducing element, for example, the cylindrical roller 129. Since the length of fit between both the tubes 125 and 126 can be made as short as possible, size reduction can be achieved while securing a predetermined shock-absorbing stroke.

In the present embodiment, at least one of the first sliding resistance reducing element and the second sliding resistance reducing element may be a rolling element such as a roller or a ball, or may use a low-friction coating applied to the corresponding tube. As a low-friction material that constitutes the low-friction coating, for example, fluororesin can be used. Next, configurations in the steering system 100A of the embodiment in FIG. 21, which are additionally provided as compared to the steering system 100 of the embodiment in FIG. 20, will be described. In the steering system 100A of the embodiment in FIG. 21, a third sliding resistance reducing element that comes into contact with the outer periphery 126a of the inner tube 126 at the upper side and reduces the sliding resistance between both the tubes 125 and 126, for example, a cylindrical roller 157 as a rolling element is retained in at least the circumferential lower region of the axial upper end portion 125U of the outer tube 125 at the lower side of the steering column 120A, and a fourth sliding resistance reducing element that comes into contact with the inner periphery 125a of the outer tube 125 and reduces the sliding resistance between both the tubes 125 and 126, for example, a cylindrical roller 158 as a rolling element is retained in at least the circumferential upper region of the axial lower end portion 126U of the inner tube 126.

Figure 21:
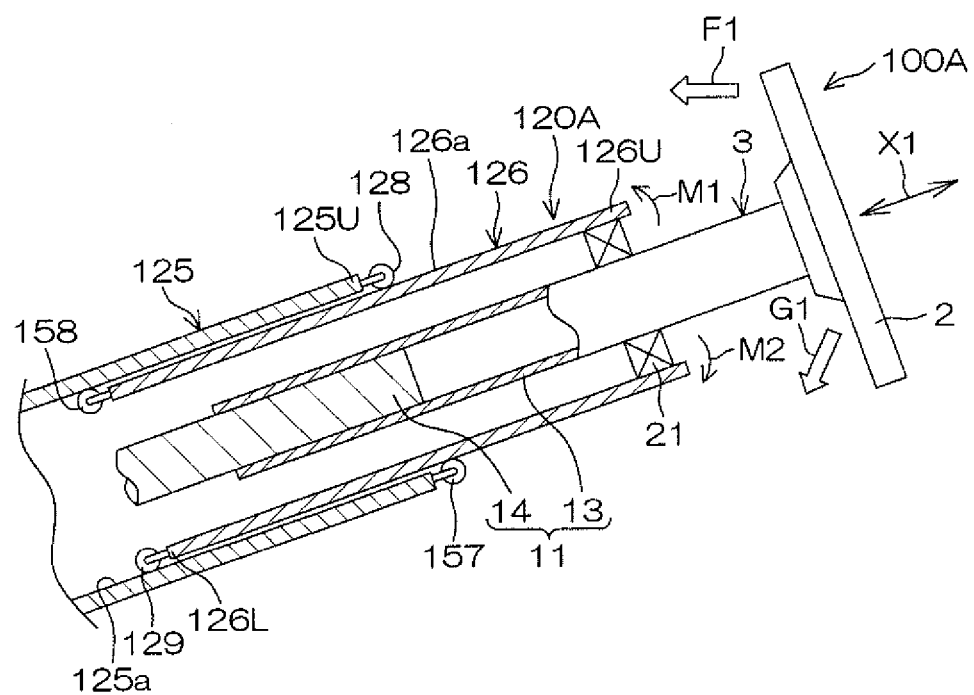
FIG. 21 is a schematic sectional view of main portions of a steering system in yet another embodiment of the invention, FIG. 21 showing a modification of the embodiment in FIG. 20.

According to the embodiment in FIG. 21, the following effects are achieved in addition to achieving the same effective effects as those of the embodiment in FIG. 20. Even when a moment M2 that tilts the inner tube 126 with respect to the outer tube 125 is generated so that the axial upper end portion 126L of the inner tube 126 at the upper side is pushed downward by the weight of the steering member 2, or the like at the time of telescopic adjustment, both the tubes 125 and 126 can be caused to slide smoothly due to the function of the third sliding resistance reducing element, for example, the cylindrical roller 157, and the function of the fourth sliding resistance reducing element, for example, the cylindrical roller 158.

In the present embodiment, at least one of the third sliding resistance reducing element and the fourth sliding resistance reducing element may be a rolling element, such as a roller or a ball, or may use a low-friction coating applied to the corresponding tube. As a low-friction material that constitutes the low-friction coating, for example, fluororesin may be used. In addition, various modifications may be made within the scope of the invention described in the claims.

What is claimed is:

1. A steering system comprising:

an outer tube at an upper side and an inner tube at a lower side that support a steering shaft so that the steering shaft is rotatable, the outer tube and the inner tube sliding relative to each other in an axial direction when shock is absorbed, and the steering shaft having one end to which a steering member is coupled;

a first sliding resistance reducing element that is retained in at least a circumferential lower region of an axial upper end portion of the inner tube, comes into contact with an inner periphery of the outer tube, and reduces sliding resistance between the outer tube and the inner tube; and a second sliding resistance reducing element that is retained in at least a circumferential upper region of an axial lower end portion of the outer tube, comes into contact with an outer periphery of the inner tube, and reduces the sliding resistance between the outer tube and the inner tube.

2. The steering system according to claim 1, further comprising:

a third sliding resistance reducing element that is retained in at least a circumferential upper region of the axial upper end portion of the inner tube, comes into contact with the inner periphery of the outer tube, and reduces the sliding resistance between the outer tube and the inner tube; and a fourth sliding resistance reducing element that is retained in at least a circumferential lower region of the axial lower end portion of the outer tube, comes into contact with the outer periphery of the inner tube, and reduces the sliding resistance between the outer tube and the inner tube.

3. The steering system according to claim 2, wherein at least one of the third sliding resistance reducing element and the fourth sliding resistance reducing element is a rolling element.

4. The steering system according to claim 2, wherein at least one of the first sliding resistance reducing element and the second sliding resistance reducing element is a rolling element.

5. The steering system according to claim 1, wherein at least one of the first sliding resistance reducing element and the second sliding resistance reducing element is a rolling element.

* * * * *